Oct. 21, 1958   L. H. HARRIS   2,856,893
TINNING APPARATUS
Filed Sept. 17, 1956   2 Sheets-Sheet 1
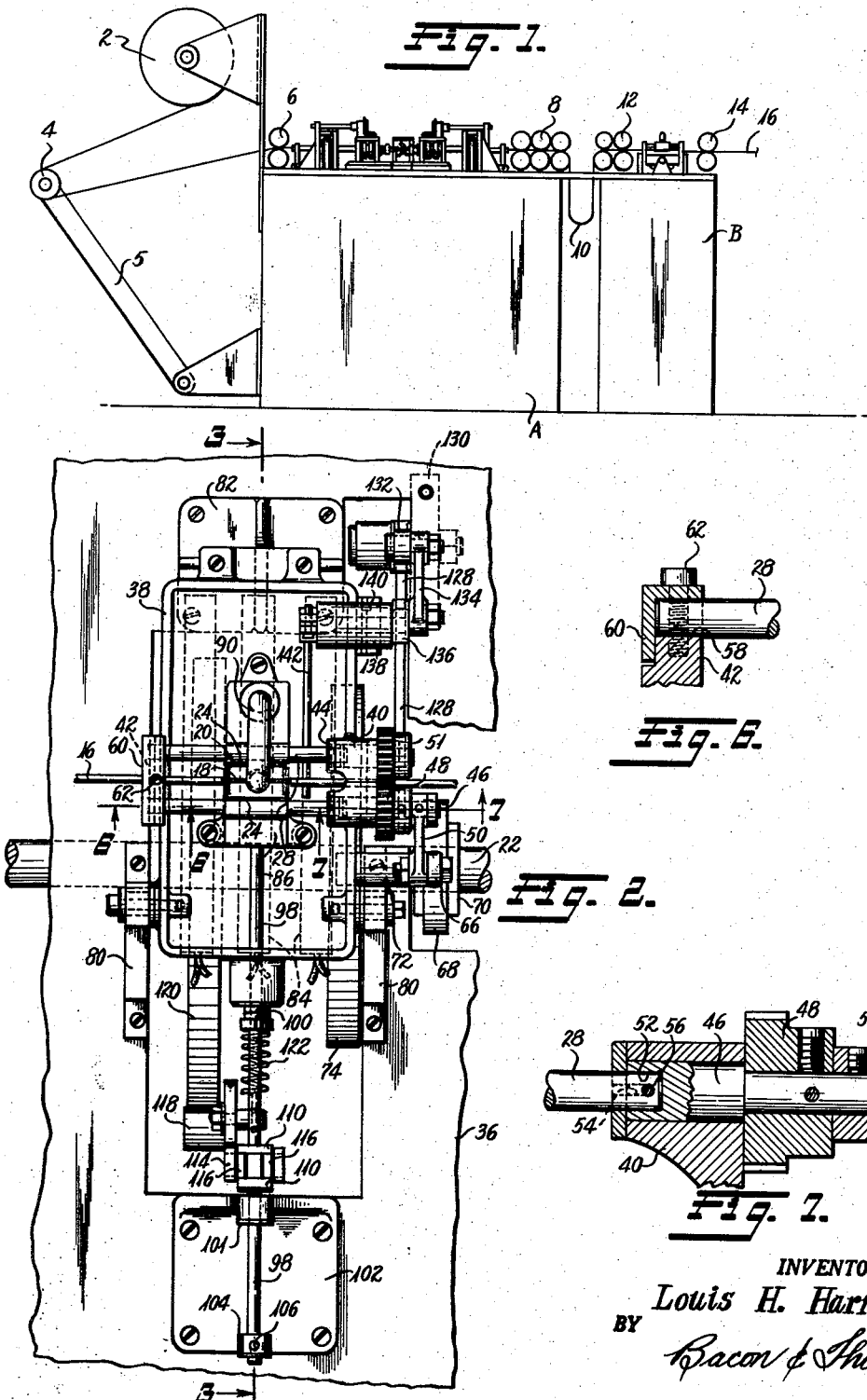
INVENTOR.
Louis H. Harris
BY
Bacon & Thomas
ATTORNEYS

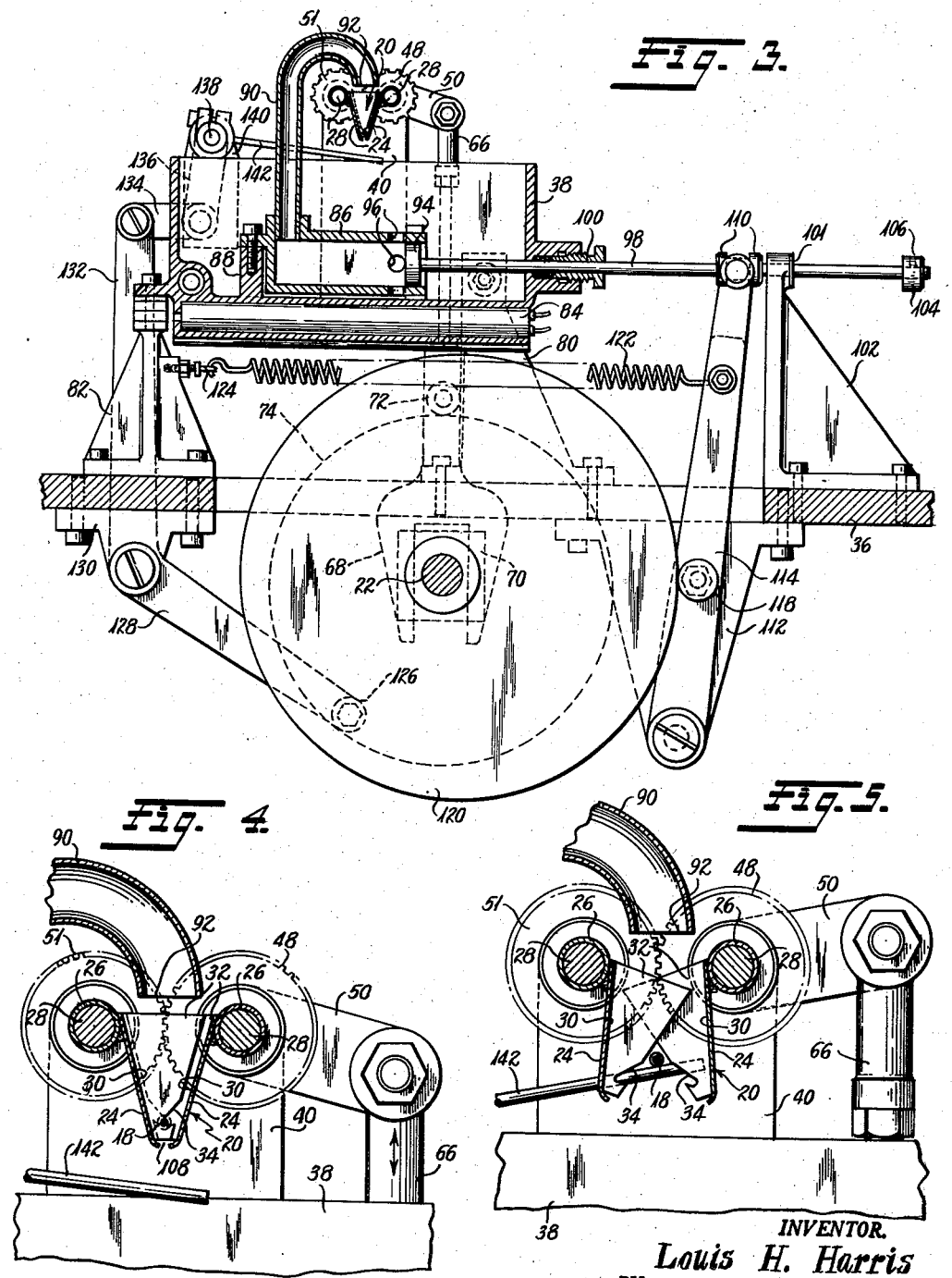

United States Patent Office 2,856,893
Patented Oct. 21, 1958

2,856,893
TINNING APPARATUS

Louis H. Harris, Durham, N. C., assignor, by mesne assignments, to Sperry Rand Corporation, Wilmington, Del., a corporation of Delaware Application September 17, 1956, Serial No. 610,157

12 Claims. (Cl. 118—29)

This invention relates to automatic machines for preparing insulated wire for use in electric systems, and particularly to a portion of such a machine for tinning portions of wire from which the insulation has been stripped.

It has been the practice heretofore to first cut wires to the desired length, then to strip the insulation from the end portions thereof, after which tinning or soldering of the bare ends was necessary. In many instances, particularly where the conducting wire consisted of a bundle of twisted or braided filaments, the severed and stripped ends had a tendency to fray, which necessitated manual twisting of the filaments together to hold them in place while assembling the wires in the electric system and soldering the same. By the present invention the aforementioned problems are eliminated by first stripping the insulation from a portion of the length of wire intermediate the ends thereof, tinning the stripped portion of the wire, and then cutting the wire intermediate the ends of the stripped portion whereby the ends cannot thereafter unravel and are ready for immediate use. In present day manufacturing techniques a large number of identical products are usually manufactured at one time, and where each product includes the same electric system, a plurality of wires of the same size and length are used. By the apparatus of the present invention a large number of such identical wires may be prepared from a continuous length of insulated wire.

The subject matter of the present application relates particularly to a tinning apparatus, wherein a separable funnel-like device is arranged to embrace the stripped portion of the wire with the stripped portion extending therethrough to direct molten solder to the wire to effect tinning thereof. The funnel-like device comprises separable sections adapted to be moved apart to release the wire therefrom. The apparatus also includes a means for tapping the wire after tinning thereof to dislodge any excess solder remaining thereon. The funnel-like device is arranged over an open reservoir having heating means and in which a supply of molten solder is retained. A pump is arranged to pump a predetermined quantity of solder from the reservoir to a discharge position over the funnel-like device whereupon the melted solder flows over the wire in the funnel. Means are provided for regulating the quantity of solder delivered to the funnel at each actuation of the pump and drive means are provided to effect timed operation of the instrumentalities described.

It is therefore an object of this invention to provide a novel mechanism for applying molten solder or the like to a portion of a length of wire from which insulation has been stripped.

It is another object of this invention to provide a tinning apparatus for flowing molten solder onto a bare wire and thereafter removing excess solder from the wire before solidification thereof.

Still another object of this invention is to provide a tinning apparatus of the type set forth including means for selectively varying the quantity of melted solder applied to the wire.

A further object is to provide novel means for directing the melted solder onto the wire and confining it to a predetermined portion thereof.

A still further object of the invention is to provide an apparatus of the type set forth including replaceable funnel sections whereby to adapt the apparatus for the tinning or wire portions of different lengths.

Further and additional objects and advantages will become apparent to those skilled in the art as the description proceeds in connection with the accompanying drawings, wherein:

Fig. 1 is a diagrammatic side elevational view of a machine for preparing insulated wire;

Fig. 2 is a top plan view of the tinning portion of the apparatus shown in Fig. 1, on an enlarged scale, with parts broken away to facilitate illustration;

Fig. 3 is a sectional view taken substantially along the line 3—3 of Fig. 2 with certain parts shown in elevation;

Fig. 4 is an enlarged fragmentary sectional view illustrating portions of the mechanism of Fig. 3 in greater detail and with the parts in a first relative position;

Fig. 5 is a view similar to Fig. 4 but showing the parts in different relative positions;

Figs. 6 and 7 are enlarged fragmentary sectional views, taken along the lines 6—6 and 7—7, respectively, of Fig. 2.

Referring first to Fig. 1, the machine shown therein comprises a stripping mechanism A and a tinning mechanism B. Suitable means support a roll 2 of insulated wire which is guided therefrom over a take-up roll 4 mounted on a pivoted arm 5 and from whence the wire extends between tensioning rolls 6 through the stripping mechanism, through an intermittently operable measuring and feeding mechanism 8 and from which the wire droops in a supply loop 10 before entering the tensioning and feed rolls 12 and 14, of the tinning mechanism B. Preferably the mechanisms A and B are operated at the same rate and may even be operated by the same driving motor. The cycles of operation of the two mechanisms involve different steps, however, which may not occur simultaneously. For this reason the loop 10 is provided whereby wire may be fed through the tinning mechanism B at the same time an operation is being performed on the wire while it is stationary in mechanism A.

The feeding and tensioning rolls 12 and 14 may be of any suitable desired type capable of feeding or drawing therethrough wire which has spaced lengths of insulation removed therefrom. Preferably they include means for detecting the presence therein of a stripped portion of the wire and thereupon determining the correct amount of wire to feed to position the portion to be tinned at the proper station in tinning mechanism B.

The feeding and tensioning rolls 12 and 14 are intermittently operable to sequentially feed predetermined lengths of the wire 16 through the tinning apparatus. The length fed thereby is determined by the spacing between the stripped portions, as stripped in the mechanism A of Fig. 1. The details and mode of operation of the feeding and tensioning rolls do not constitute part of this invention, it being only necessary that suitable devices be provided for intermittently feeding the wire 16 to position those portions thereof which have been stripped of insulation in a predetermined position relative to the mechanisms to be described.

The mechanisms A and B may be driven by the same power source through an interconnecting drive shaft (not shown) so that both mechanisms operate at substantially the same rate, that is, to perform their respective processes on each length of wire in the same length of time.

The wire fed through the mechanism B extends transversely of the portion shown in Fig. 2, as indicated by numeral 16 therein, and is held with the portion 18 from which insulation has been stripped in position to be embraced by a funnel-like device indicated generally at 20. The mechanism B is controlled and driven by a cam shaft 22 (see also Fig. 3) upon which a plurality of cams are fixed. The shaft 22 is preferably rotated intermittently through one complete rotation and thereafter stopped while wire is being fed through the apparatus.

The funnel device 20 previously referred to comprises a pair of channel sections 24 fixed, as by welding, to tubular carriers or supports 26. The supports 26 are mounted in fixed relation on shafts 28 arranged in parallel spaced relation in the apparatus. The channel sections 24 each include a web 30 and side flanges 32 with those flanges arranged in overlapping relation. Each of the side flanges 32 is provided adjacent its lower end with a generally V-shaped notch 34 (see particularly Fig. 5) extending inwardly from its free edge and so arranged that when the funnel sections are in the "closed" position of Fig. 4 the notches 34 overlap to such an extent that their bottom portions define aligned openings through opposite sides of the funnel 20. The shafts 28 are so positioned relative to the path of movement of the wire 16 that the funnel sections close upon the wire, as shown in Figs. 2 and 4, without materially disturbing the position of the wire. The distance between the side flanges 32 of each channel section 24 is such that the notches 34 embrace the wire 16 closely adjacent the ends of the insulation with the stripped portion of the wire extending through the funnel.

The cam shaft 22 previously referred to is supported for rotation on the apparatus frame, which frame includes a top member 36. The top member 36 supports a reservoir 38, to be described later, the sides of which reservoir are provided with brackets 40 and 42 for supporting the shafts 28.

Referring now to Figs. 2 and 7, the bracket 40 rotatably supports a pair of stub shafts 44 and 46 in parallel relation and arranged coaxially with the shafts 28. The stub shaft 46 has fixed thereto outwardly of the bracket 40 a gear 48 meshing with a gear 51 fixed to the outer end of the stub shaft 44. The stub shaft 46 also has a lever 50 fixed thereto. The inner end of each of the stub shafts 44 and 46 is provided with a socket 52 adapted to receive an end of one of the shafts 28. Opposed slots 54 are cut inwardly from the ends of the shafts 44 and 46 on diametrically opposite sides of the sockets 52 to receive transverse pins 56 carried by the shafts 28. The pins 56 serve as driving connections between the stub shafts and the shafts 28 while sockets 52 constitute means for holding the shafts 28 in alignment with their respective stub shafts and for support thereof. The opposite ends of the shafts 28 are supported in the bracket 42 in the manner shown in Fig. 6. As shown, the bracket 42 is provided with a pair of notches or recesses 58 in its upper edge adapted to rotatably support the ends of shafts 28. An angle cap 60 overlies the notches 58 and is removably secured to the bracket 42 by a screw 62 to releasably retain the ends of shafts 28 in their notches 58 and to abut the outermost ends of those shafts to prevent axial movement thereof in a direction away from stub shafts 44 and 46. As clearly shown in Fig. 2, the channel sections 24 constituting the funnel device 20 are carried by shafts 28 substantially intermediate the ends thereof. By removing the cap 60 the shafts 28 and their channel sections may be readily removed for replacement by other shafts carrying channel sections of different dimensions to adapt the apparatus for tinning stripped sections of different lengths and/or wires of different diameter.

As will be obvious from the structure thus far described, rocking of the lever 50 to partially rotate the stub shaft 46 results in equal and opposite rotation of the gear 51 and its corresponding shaft 28 whereby the channel sections 24 may be moved to either of the positions shown in Fig. 4 and Fig. 5.

The lever 50 is pivoted to the upper end of a link 66 (see Fig. 3) having a bifurcated lower end 68 slidably mounted and guided on a block 70 which, in turn, is rotatably supported by the shaft 22. The link 66, intermediate its ends, carries a cam follower roller 72 bearing on the periphery of a cam 74 fixed on shaft 22. The cam 74 is suitably configured to oscillate lever 50 in a manner to be described.

The reservoir 38 is supported by brackets 80 and 82 substantially above the machine top 36 to provide clearance for the cams thereunder and, as stated above, in turn supports the brackets 40 and 42 upon which shafts 28 are mounted. The reservoir 38 comprises an open-topped container for holding a supply of molten solder or the like therein. The solder is maintained in a molten state by a plurality of electric heating units 84 mounted in recesses formed in the bottom wall of the reservoir 38.

A pump comprising a cylinder 86 removably secured to a bracket 88 in the reservoir is provided with an outlet conduit 90 extending upwardly therefrom and curved over one of the shafts 28 to position its discharge end 92 directly over the upper open end of the funnel device 20. A piston 94 is slidable in the cylinder 86 from a retracted position wherein inlet openings 96 are uncovered to a variable position inwardly thereof, as will be described. A piston rod 98 is fixed to the piston 94 and extends outwardly of the reservoir 38 through a suitable packing gland 100 in one wall of the reservoir. The outer portion of the piston rod 98 is slidably guided in a bracket 102 mounted on the machine top 36, which bracket is provided with an annular face 101 around the rod 98 constituting a fixed abutment for engagement by a stop element 104 longitudinally adjustable on the piston rod 98. The stop element 104 is held fixed in a selected position of adjustment on rod 98 by means of a set screw 106. Movement of the piston 94 to the left (Fig. 3) is the pumping stroke of the piston. When the piston is in its righthand position shown in Fig. 3, molten solder may enter the inlet openings 96 to fill the cylinder 86. Thereafter as the piston moves to the left the openings 96 are covered thereby and the piston then forces the molten solder in cylinder 86 outwardly through conduit 90 and discharges that solder into the funnel device 20.

It is to be noted that the notches 34 in the overlapping flanges 32 are located adjacent the lower ends thereof and closely adjacent the lower edges of the webs 30. Since those webs 30 converge downwardly and define a narrow outlet slot 108 (Fig. 4), the body of solder delivered into the funnel is so restricted in its passage therethrough that the funnel stays about half full of melted solder for an appreciable time to insure complete wetting and heating of the bared portion of the wire 16 extending through the funnel device 20 before that solder has entirely drained back into the reservoir 38. The stop 104 may be adjusted to a selected position along piston rod 98 to thus predetermine the volume of melted solder pumped by the piston 94 at each stroke thereof so as to keep the funnel partially filled, even though solder continues to flow through slot 108, in order to maintain a proper temperature of the solder in the funnel. The cycles of operation are so timed that the funnel is opened while still holding a body of solder and that body is thus "dumped" into reservoir 38.

The piston rod 94 is further provided with spaced fixed collars 110 thereon.

A bracket 112 fixed to the machine top 36 and extending downwardly therefrom, pivotally supports a lever 114, bifurcated at its upper end and provided with inwardly directed trunnions 116 received between the collars 110 on piston rod 98. The lever 114 is provided with a cam follower roller 118 bearing against the periphery of a cam 120 fixed on shaft 22. A tension spring 122 is fixed at one end to the lever 114, and anchored at its other end to a suitable eyelet 124 carried by the bracket 82. The tension spring 124 thus urges the roller 118 against the periphery of cam 120 and in fact constitutes the power source for actuating the piston 94 on its pumping stroke. The cam 120 serves to retract the piston 94 to its starting position and to "load" spring 122. The mechanism thus described constitutes a driving means for a solder delivering pump and includes what might be termed a "lost-motion" connection so that the cam 120 may continue to rotate without enforcing a full pumping stroke of the piston 94 and thus also prevent breakage in the event the machine is operated at a time when the solder in the pump is in a solid state. The quantity of molten solder delivered by the pump at each stroke will be determined by the diameter of the wire 16 and the length of the portion thereof to be tinned. It is desirable to use as small a quantity as possible to thus conserve heat.

The cam 74, previously described, is provided on one axial face thereof with a cam groove (not shown) receiving a cam follower 126 carried by an arm 128 of a bell crank which is pivotally mounted on bracket 130 mounted on machine top 36. The other end 132 of the bell crank is pivoted to a link 134 which in turn is pivoted to a lever 136 fixed to a shaft 138 journalled in a bracket 140 carried by one side wall of the reservoir 38. The shaft 138 also has fixed thereon a radially extending rod or tapping device 142.

The cams 74 and 120 are so configured and designed that a single revolution of the cam shaft 22 causes the mechanisms described to operate in the following sequences:

The shaft 22 is normally at rest in such a position that the piston 94 is in its retracted position as shown in Fig. 3, the tapping device 142 is in its lower position as also shown in Fig. 3, and the sections 24 of the funnel device 20 are separated as shown in Fig. 5. As is obvious from Fig. 5, the insulated wire 16 may be fed longitudinally of itself without interference from the funnel sections 24 until it is automatically positioned and stopped with a bared portion thereof at the funnel position. When the wire feeding mechanism stops the shaft 22 is automatically actuated through one complete revolution and then again stopped. When the shaft 22 starts to rotate at the beginning of each cycle of operation, the periphery of cam 74 first permits the follower 72 and the link 66 to move downwardly to swing the funnel sections from the position of Fig. 5 to the position of Fig. 4 in embracing relation to the bare wire portion 18. Thereafter the cam 120 rotates to where its periphery moves inwardly away from the follower roller 118 to permit spring 122 to actuate the pump piston 94 through its pumping stroke, as determined by the position of stop 104 of piston rod 98. The pump thus pumps a predetermined quantity of solder into the funnel to thoroughly tin the wire 16 therein. After the the piston 94 completes its pumping stroke, cam 120 returns the piston to the Fig. 3 position and cam 74 lifts follower 72 and link 66 to again open the funnel sections to the position of Fig. 5. After the piston 94 is returned to the starting position of Fig. 3 the follower 118 rides on a "dwell" portion of cam 120 to hold the piston in its retracted position during the remainder of the cycle. Likewise, the cam 74 is so configured as to provide dwell portions to hold the funnel closed during the pumping stroke and to thereafter open the funnel and hold it open during the remainder of the cycle. After the wire 16 has been tinned in the manner described and the funnel 20 opened to the position of Fig. 5, the cam groove in the face of cam 74 actuates bell crank 128, 132 to rock shaft 138 and snap tapping device 142 against the wire 16 to vibrate the latter and dislodge any drops or excessive quantity of solder still clinging thereto. The tapping device 142 is then returned by the cam groove to its retracted position of Fig. 3 by the time the shaft 22 completes one revolution whereupon the shaft 22 stops and the parts are conditioned for feeding an additional length of wire therethrough and for the subsequent performance of the cycle just described.

It is contemplated that the apparatus include means (not shown) for atomizing liquid resin flux and directing it onto the stripped wire in the funnel just prior to pumping molten solder over the wire.

While a single specific embodiment of the invention has been shown and described herein, that embodiment is merely illustrative and it is contemplated that the invention encompass other forms of apparatus falling within the scope of the appended claims.

I claim:

1. In apparatus for tinning a limited portion of a length of wire; means on said apparatus for holding said length of wire in a predetermined position, an open funnel device comprising separable sections mounted for movement toward each other and into embracing relation with the ends of said portion and with said portion extending transversely through said funnel adjacent the discharge end thereof, delivery means for delivering a predetermined volume of molten metal into said funnel for passage therethrough and around said portion, and cyclically operable drive means for moving said sections toward each other and thereafter actuating said delivery means.

2. Apparatus as defined in claim 1 wherein said drive means thereafter stop said delivery means and then move said sections apart.

3. Apparatus for tinning a portion of a length of wire, comprising; means for directing a measured body of molten metal transversely over said portion and confining said metal to contact with only said portion, tapping means for tapping said wire spaced from but adjacent said portion to dislodge excess molten metal clinging to said portion, and cyclically operable drive means for delivering successive measured bodies of molten metal to said directing means and for intermittently actuating said tapping means in sequential timed relation to delivery of successive bodies of metal to said directing means.

4. Apparatus for tinning a portion of a length of wire wherein a funnel device directs molten metal over said wire; said funnel device being defined by a pair of generally vertically arranged channel sections, each having a web and side flanges, arranged with their flanges in overlapping relation, said flanges having opposed notches extending inwardly from the edges thereof and of such depth that the bottoms thereof overlap to define openings through opposite sides of said funnel device, and means for moving the notched portions of said sections apart to permit positioning a wire therebetween to be embraced by said openings when said sections are again moved toward each other.

5. Apparatus as defined in claim 4 wherein said channel sections are rotatably mounted about spaced parallel axes substantially above said notches.

6. Apparatus as defined in claim 4 wherein each of said channel sections is fixed to a shaft for rotation therewith, said shafts being in spaced parallel relation and said sections extending generally downwardly therefrom, said means for moving said sections comprising drive means arranged to rock said shafts in opposite directions.

7. Apparatus as defined in claim 6 wherein said drive means comprises a pair of parallel stub shafts journalled on said apparatus, mutually meshing gears fixed to said stub shafts, means on corresponding ends of said stub shafts for releasably but drivingly engaging the ends of said first-named shafts, and means rotatably but removably supporting the other ends of said first-named shafts, said channel sections being secured to said first-named shafts intermediate the ends thereof.

8. Apparatus as defined in claim 4, wherein each of said channel sections is fixed to a shaft for rotation therewith, said shafts being in spaced parallel relation and the webs of said sections converging downwardly therefrom with the lower edges of said webs defining a narrow outlet slot, said notches being adjacent said lower edges, said means for moving said sections comprising drive means arranged to rock said shafts in opposite directions.

9. Apparatus for tinning a limited portion of a length of wire, comprising; means for directing a body of molten metal transversely directly on only said portion, an open reservoir below said directing means for receiving excess metal, a positive displacement pump having an inlet communicating with said reservoir and an outlet arranged to deliver a measured quantity of molten metal to said directing means, and cyclically operable drive means for said pump whereby said pump sequentially delivers separate measured quantities of molten metal to said directing means.

10. Apparatus as defined in claim 9 wherein said pump comprises a cylinder and a piston therein having a piston rod extending outwardly of said reservoir, said drive means being arranged to reciprocate said piston, and an adjustable lost-motion driving connection between said drive means and said piston whereby the length of the pumping stroke of said piston may be regulated.

11. Apparatus as defined in claim 9 wherein said pump comprises a cylinder and a piston therein having a piston rod extending outwardly of said reservoir, said drive means comprising a rotary cam, a cam follower engaging the periphery of said cam, resilient means urging said cam follower against said periphery, means drivingly connecting said follower to said piston rod, the arrangement being such that said cam drives said piston on its intake stroke and said resilient means drives said piston on its pumping stroke, a fixed abutment on said apparatus adjacent said piston rod, and a longitudinally adjustable stop on said piston rod engageable with said abutment to limit the length of the pumping stroke of said piston.

12. In apparatus for tinning a portion of a length of wire; means on said apparatus for positioning and holding said fixed portion in a predetermined position, a funnel device at said position comprising separable sections mounted for movement toward each other and into embracing relation with the ends of said portion and with said portion extending transversely through said funnel and for movement away from each other to free said wire, delivery means for delivering a predetermined quantity of molten metal into said funnel for passage therethrough and around said portion, tapping means for vibrating said wire to dislodge excess metal therefrom, and cyclically operable drive means for sequentially moving said sections toward each other, actuating said delivery means, moving said sections away from each other, and then actuating said tapping means.

References Cited in the file of this patent
UNITED STATES PATENTS

| | | |
|---|---|---|
| 936,472 | Pfanhauser | Oct. 12, 1909 |
| 2,008,813 | Bradley | July 23, 1935 |
| 2,192,982 | Meendsen | Mar. 12, 1940 |
| 2,528,009 | Lorch | Oct. 31, 1950 |
| 2,562,500 | Lunt | July 31, 1951 |
| 2,772,518 | Whitehurst | Dec. 4, 1956 |